United States Patent [19]
Pavel

[11] 3,736,734
[45] June 5, 1973

[54] ROW CROP HEADER ATTACHMENT

[76] Inventor: Raymond F. Pavel, R.R., Scotland, S. Dak. 57059

[22] Filed: Jan. 12, 1972

[21] Appl. No.: 217,118

Related U.S. Application Data

[63] Continuation-in-part of Ser. No. 81,672, Oct. 19, 1970, abandoned.

[52] U.S. Cl............................................56/119, 56/94
[51] Int. Cl..............................................A01d 45/02
[58] Field of Search.....................56/13.5, 13.9, 13.7, 56/14.3, 56, 59, 93, 94, 98, 106, 108, 119

[56] References Cited

UNITED STATES PATENTS

| | | | |
|---|---|---|---|
| 322,459 | 7/1885 | Lewis et al. | 56/98 |
| 491,889 | 2/1893 | Hunt | 56/93 |
| 2,139,883 | 12/1938 | Curry | 56/56 |
| 2,948,100 | 8/1960 | McEachern | 56/119 |
| 3,035,387 | 5/1962 | Bevill | 56/28 |
| 3,095,680 | 7/1963 | Thornton | 56/119 |
| 3,492,797 | 2/1970 | Sears | 56/119 |

*Primary Examiner*—Russell R. Kinsey
*Attorney*—Zarley, McKee & Thomte

[57] ABSTRACT

An apparatus for harvesting a crop such as a sunflower seed crop with said apparatus being formed as an attachment to a conventional combine and which embodies the use of spaced pairs of forwardly extending tapered hood members respectively arranged and constructed to carry cooperating pairs of endless brush belts having a run therebetween, said belts being disposed to travel substantially in a horizontal plane, the stalks of plants being engaged and drawn into the harvester by the brush belts which hold the stalks in a relatively stable position until engagement with the cutting member of the combine and the delivery of said stalks into the combine with the result of very little, if any, loss of seed.

11 Claims, 8 Drawing Figures

ROW CROP HEADER ATTACHMENT

CROSS-REFERENCED APPLICATION

This application is a continuation-in-part of my copending application Ser. No. 81,672 filed, now abandoned Oct. 19, 1970 entitled Row Crop Combine Header Attachment.

SUMMARY OF THE INVENTION

The invention herein relates to a harvester as an attachment to a combine with said harvester being particularly adapted for use in harvesting a seed crop such as a sunflower seed crop.

It is an object of this invention to provide an apparatus constructed and arranged to engage and hold the stalk bearing the seed crop in a relatively stable position to prevent undue shaking of the stalk and to prevent loss of seed borne by the stalk in the course of harvesting.

It is another object of this invention to provide an apparatus adapted to engage each row of the crop to be harvested and hold upright the stalks engaged by the harvester until the stalks are cut and delivered to the combine.

It is a further object of this invention to provide an apparatus having cooperating endless brush members which receive and hold upright at their ground position the stalks engaged for harvesting as the harvester advances to cut the stalks and said to a are thus held until delivered into the receiving auger of the combine.

Generally stated the apparatus herein comprises a pair of endless brush belts for each row of crop harvested, said belts are suitably supported and driven with respect to one another to have a converging run wherein there is interengagement of the brush belts to engage and hold the therebetween. As said harvester advances, the endless movement of the brush belts hold the stalks in their natural upright positions as the cutting member is advanced to the stalk. With further advance of the harvester and prior to engagement of the stalk by the cutting member, a cooperating pair of brush members positioned higher than said endless brush belts engage an upper portion of the stalk. The stalk is thus well supported at lower and upper portions thereof at the time of being cut free and the seed head along with the stalk is delivered into the receiving auger of the combine with very little shaking effect of the stalk.

These and other objects and advantages of the invention will be set forth in the following description made in connection with the accompanying drawings in which like reference characters refer to similar parts throughout the several views and in which FIG. 1 is a view in side elevation showing a portion in dotted line and showing only a fragmentary view of a combine;

DESCRIPTION OF THE PREFERRED EMBODIMENTS

A First Embodiment

Referring to the drawings, the harvesting apparatus which is the subject matter of the invention herein is indicated generally by the reference numeral 10.

Figure 2:
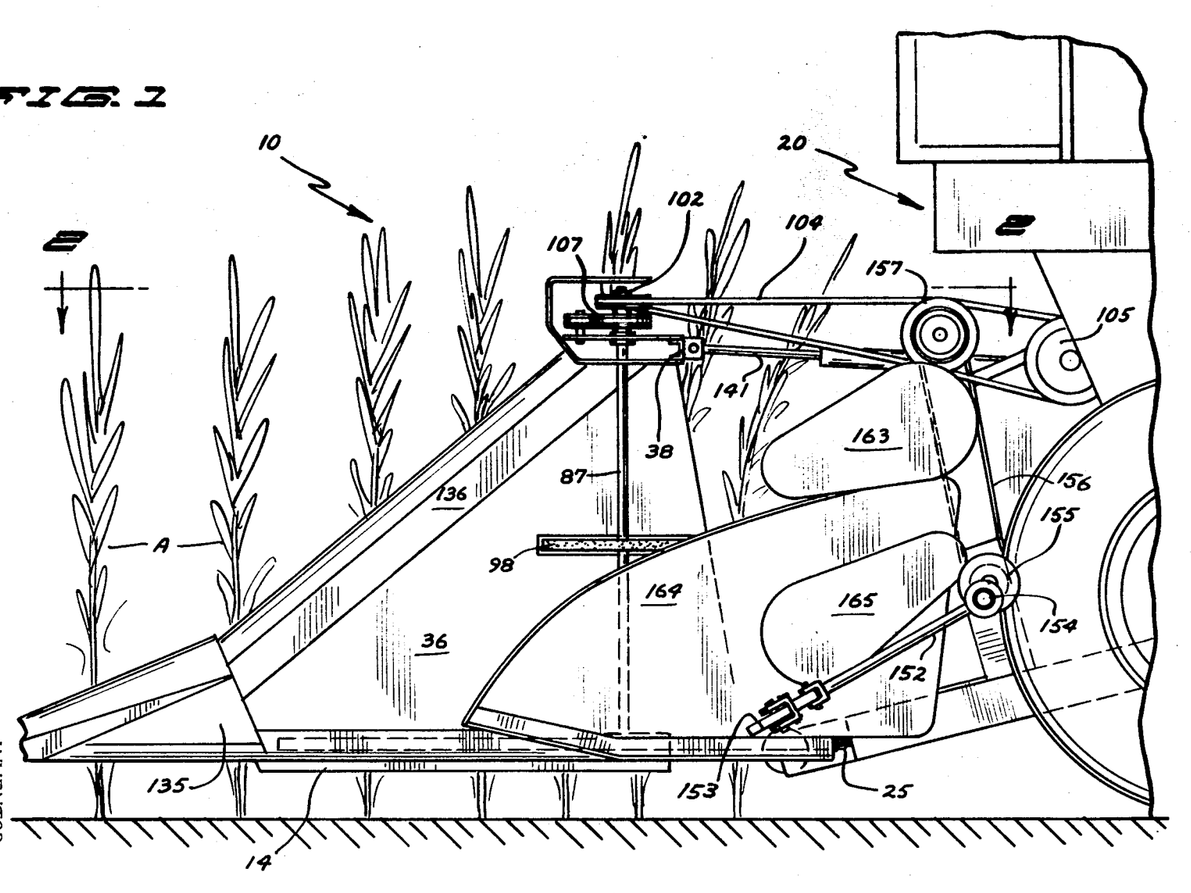
FIG. 2 is a view in horizontal section taken on line 2—2 of FIG. 1 as indicated and having portions thereof broken away and other portions shown in dotted line.

Although the apparatus herein with reference to FIG. 2 is indicated as a unit adapted to harvest two rows of crop at one time, it will be understood that units of said apparatus may be expanded to harvest simultaneously a greater number of rows.

Only so much of the apparatus is shown and described as is deemed necessary for a fully adequate disclosure of the subject matter of the invention herein. Only a fragmentary portion of a combine is shown to indicate an operative relationship.

Figure 4:
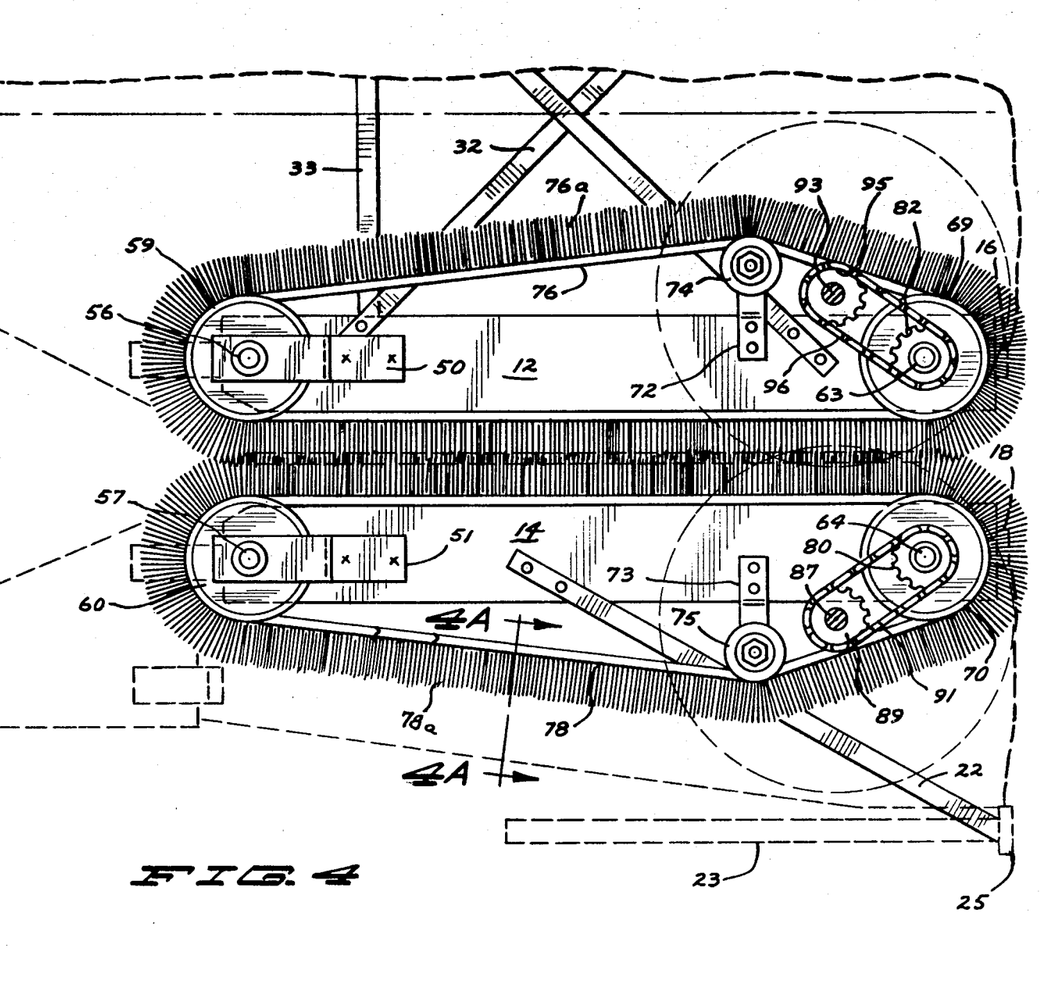
FIG. 4 is a view in horizontal section taken on lines 4—4 of FIG. 3 with portions broken away and some portions thereof in dotted line.

Referring to FIG. 4, supporting elements of structure are formed of elongated plate-like members 12 and 14 having hinge plates 16 and 18 at the rear ends thereof for connection with corresponding hinge portions carried by the combine 20 to which the apparatus 10 will be attached.

A supporting member or strut 22 is angled outwardly rearwardly of the plate member 14 and is secured at its free end to a side frame member 23 and carries at its free end a hinge plate 25 which will be connected to a corresponding hinge portion carried by said combine as indicated in FIG. 1.

With reference to FIG. 2, plate member 14 is an outer member and a corresponding plate member 28 is carried at the opposite outer side of said unit 10. Said plate member 12 is spaced inwardly of said plate member 14 and has disposed oppositely thereof and inwardly of said plate member 28 a plate member 30. The respective pairs of plate members 12–14 and 28–30 have operative relationship.

The plate members 12 and 30 are secured in spaced relation by an X-frame member 32 and a transverse member 33.

Figure 3:
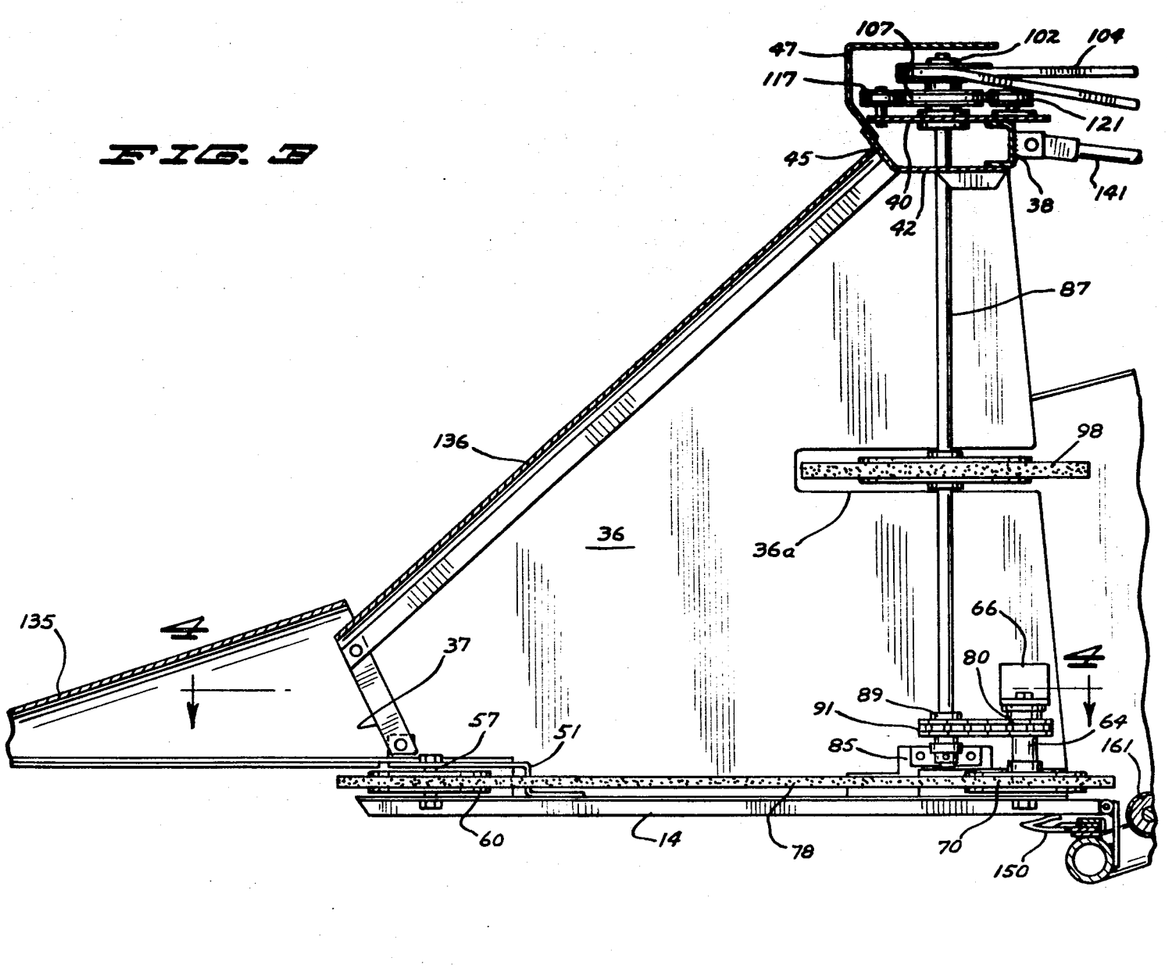
FIG. 3 is a view in vertical section taken on line 3—3 of FIG. 2 with portions thereof broken away.

Upstanding from the inner sides of said plate members 12 and 14 and secured as by angle brackets are supporting wall members 35 and 36 being angled downwardly forwardly in side elevation as shown in FIG. 3 with respect to the wall 36. Said walls have inwardly angled forward end wall portions as indicated at wall portion 37 of said wall 36. The wall members and plate members are readily connected as by welding or by being bolted. The specific means of fastening is regarded as being known in the art. Walls similar to the walls 35 and 36 will be upstanding from said plate members 28 and 30.

Extending across the upper rear portions of said vertically disposed walls is an inwardly turned channel member 38. Supported on the upper flange of said member 38 extending therealong and forwardly thereof is an elongated plate member 40. Secured to the lower flange of said member 38 is an elongated plate member 42 extending therealong and forwardly thereof having an upwardly angled front wall 45. Angled upwardly from said wall 45 and being angled rearwardly to overlie said plate member 40 in vertically spaced relation thereto is a shield or cover member 47. Said members 45 and 47 serve to box in a pulley drive mechanism hereinafter to be described.

Adjacent the forward end portions of said plate members 12, 14, 28 and 30 and as shown in connection with the members 12 and 14 are upwardly angled forwardly extending brackets 50 and 51. Disposed between said brackets 50 and 51 and the underlying plate members 12 and 14 are shafts 56 and 57 having journaled thereon pulleys 59 and 60. Adjacent the rear of said plate members are vertically disposed stub shafts 63 and 64 extending upwardly from said plate members in being journaled therein and being journaled at their upper ends in brackets such as the angled bracket 66 carried by the member 36. Carried on said shafts 63 and 64 are pulleys 69 and 70 in horizontal alignment with the pulleys 59 and 60.

Extending oppositely outwardly of said plate members 12 and 14 rearwardly thereof are plate brackets 72 and 73 carrying respectively at their free ends idler pulleys 74 and 75.

Figure 4A:
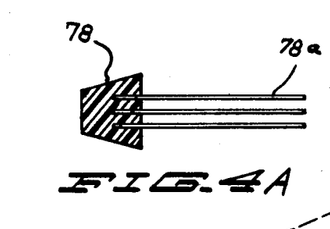
FIG. 4a is a view in transverse section on an enlarged scale taken on line 4a—4a of FIG. 4 as indicated.

Passing over said pulleys 59, 69 and 74 is an endless V-type belt 76 having embedded therein and extending outwardly thereof bristles 76a with said bristles being of substantial length as indicated in FIG. 4a. A similar belt 78 bearing bristles 78a passes over the pulleys 60 and 70 and the idler pulley 75. Said belts are hereafter referred to as endless brush belts and the bristles of said brush belts interengage in the run of said belts along the adjacent sides of said plate members 12 and 14 as indicated in FIG. 4. Said bristles shall be of sufficient stiffness to support stalks therebetween such as sunflower stalks.

Carried on said shafts 63 and 64 positioned above said pulleys 69 and 70 are sprockets 80 and 82.

Forwardly of said shaft 64 upstanding from said plate member 14 is an angled bracket 85. Journaled between said bracket 85 and said plate member 40 is a shaft 87. Said shaft adjacent its lower end carries a sprocket 89 and a sprocket chain 91 which chain passes over sprockets 80 and 89. A shaft 93 corresponding to shaft 87 is shown in connection with the plate member 12 and it is journaled in a manner like that of shaft 87 and it carries a sprocket 95 which has a sprocket chain 96 passing thereover and over the sprocket 82.

Substantially centrally vertically of the rearward portion of said wall member 36 is a substantially rectangular openended slot 36a. Carried on said shaft 87 and adapted to pass through said slot 36a is a circular disclike brush 98 having bristles on the order of the bristles of the endless belts 76 and 78. Carried on said shaft 93 will be a brush 100 and said brushes 98 and 100 will be of sufficient diameter to interengage as indicated in phantom views in FIGS. 2 and 4.

Carried at the upper portion of the shaft 87 is a pulley 102 which is driven by a belt 104 and said belt will pass over pulley 105 carried by the combine and which pulley will be driven in a conventional manner by connection to a power source carried by said combine. Positioned below said pulley 102 on said shaft is a pulley 107. The shaft 93 will carry a pulley 109 corresponding to the pulley 107.

The plate members 28 and 30 will comprise structure corresponding to the structure in connection with the plate members 12 and 14 and as more particularly described in connection with said plate member 14 and will have the same cooperative functional relationship as the structures comprising the plate members 12 and 14. Said plate members 30 and 28 will have shafts 110 and 112 respectively corresponding to the shafts 87 and 93 and carried on said shafts are pulleys 113 and 115 respectively corresponding to the pulleys 107 and 109.

Carried by said plate member 40 are a pair of aligned idler pulleys 117 and 118. Also carried by said plate member 40 is a conventional belt tensioning member 120 of which detailed description is not deemed necessary and in connection therewith are pulleys 121 and 122. It will be noted in FIG. 2 that the plate member 40 has central slotted portions.

All of said pulleys 107, 109, 113 and 115 are operatively connected by a belt 124 passing thereover as indicated in FIG. 2 and said belt is driven by the pulley 107 which in turn is driven with the shaft 87 by the pulley 102 and the driving belt 104 in connection therewith. Said belt 124 passes over the tensioning pulleys 121 and 122 and also passes over the idler pulleys 117 and 118. Hence it is seen that with respect to the plate members 14 and 12, the driven shafts 87 and 93 in turn drive the circular brushes 98 and 100 and also drive the endless brush belts 76 and 78, and that the rate of movement of said brush members is coordinated.

Carried by the wall members 36 and 35 and the corresponding wall members 30 and 28 are shield or cover members 130, 131 and 132. A single cover member will overlie the plate members 12 and 30. Said cover members between said plate members 30 and 28 will extend down to just above the endless brush belts and further will be suitably slotted to permit the rotation and interengagement of the adjacent circular brushes 98–100 and the corresponding brushes in connection with the plate members 30 and 28. Depending forwardly of said cover members and tapered away from adjacent of one another are nose cover members 135, 136 and 137. Thus it is seen that rows of crop will be received between the members 135 and 136 and between the members 136 and 137. Said cover members will be secured in a conventional manner.

Outwardly of the plate member 28 is a side frame member 140 corresponding to the side frame member 23.

Although not here shown, said apparatus 10 will be suitably hingedly connected to the combine 20 by means of hinges 16, 18, 25 and other corresponding hinges not here shown.

Connected to said channel member 38 as adjacent either end thereof are piston arms 141 and 142 which in connection with conventional hydraulic cylinders operated from said combine 20 will control the level or tile of said apparatus from the axis of said hinges as indicated with reference to hinge 25 in FIG. 1.

Referring to FIGS. 1 and 3, the combine 20 will carry a conventional cutter bar 150 which will be reciprocated by a pitman arm 152 operating a belt crank 153. Said pitman arm is shown connected to an eccentric member 154 which is operatively connected to pulley 155 which is driven by a belt 156 passing over a driving pulley 157 which is driven by the belt 104.

Adjacent said cutter bar and carried by said combine is a crop receiving member 160 shown here as a helical screw or auger member which receives the drop delivered to it by the endless and circular brush members after the operation of the cutter blade and said auger feeds the same onto a conveyor 161 which carries the crop into the combine.

The members 163-165 are conventionally mounted shield members requiring no description here. The reference character A indicates the stalks of the crop being harvested.

A Second Embodiment

Figure 5:
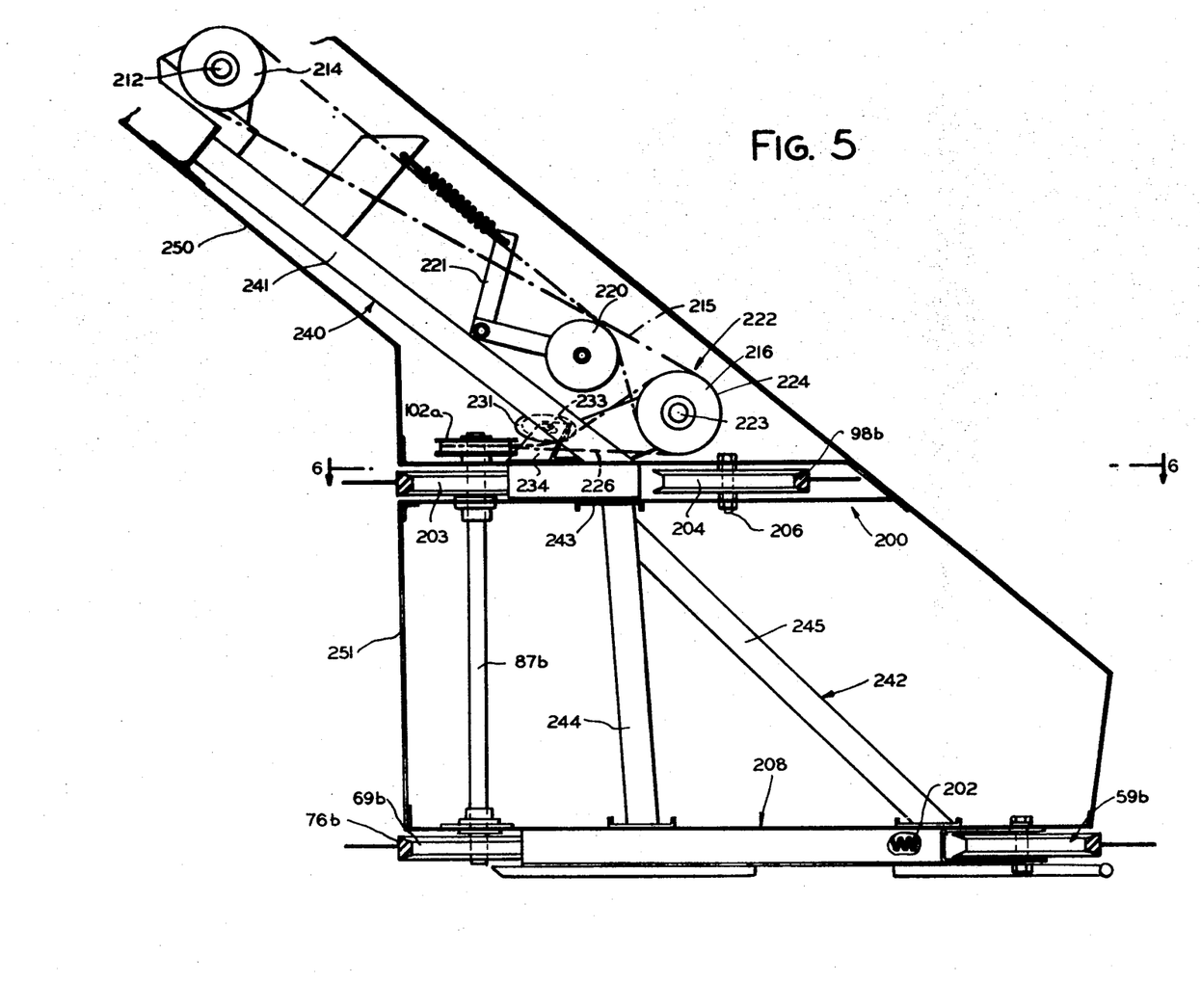
FIGS. 5—5a are vertical, longitudinal and transverse, sectional views respectively of another embodiment of the apparatus.
Figure 5A:
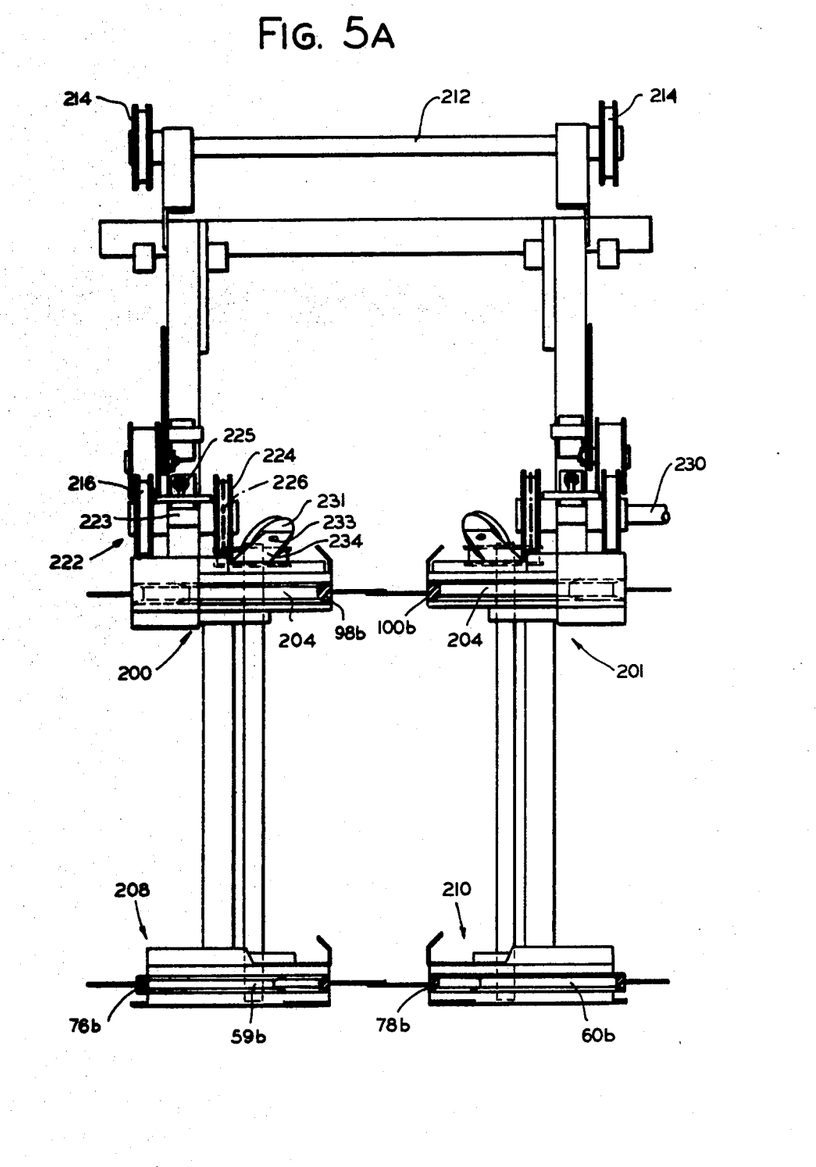
Figure 6:
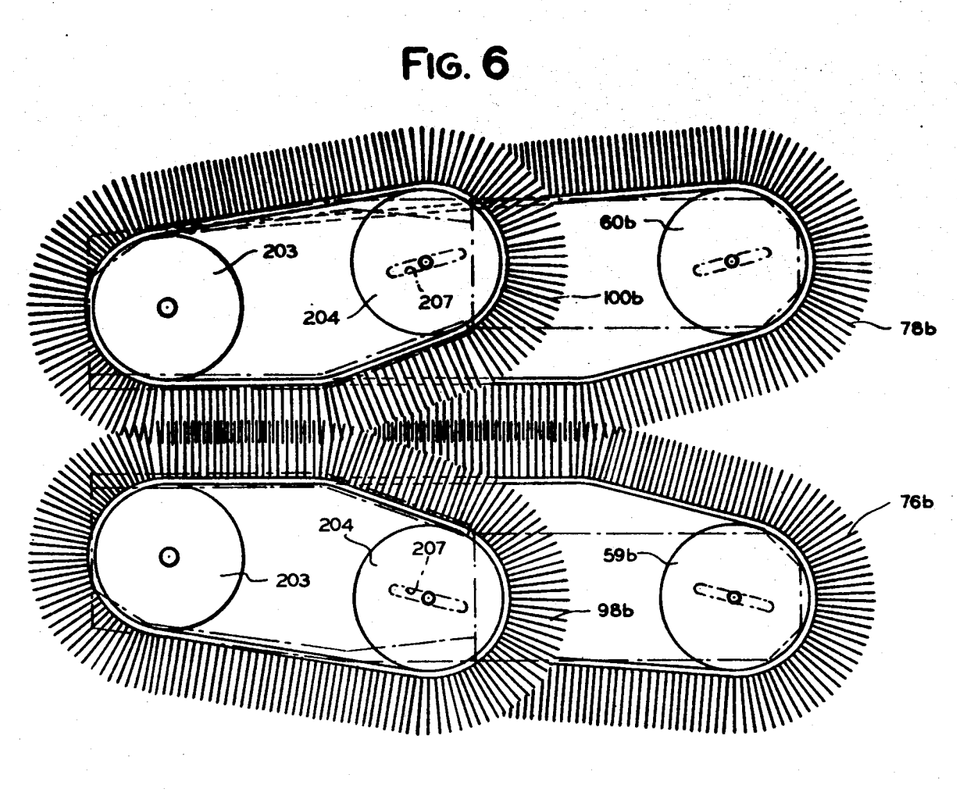
FIG. 6 is a partial, horizontal sectional view of the apparatus taken along lines 6—6 of FIG. 5.

FIGS. 5, 5a and 6 show a second embodiment 10a of the apparatus where the principal differences are that instead of circular brushes 98-100 as in the first embodiment, there is a pair of upper endless brush belts 98b-100b for holding the upper portion of the crops. There is also a modified belt drive arrangement. In addition, the hood structure has an internal frame and outer skin construction which is of a lighter weight than the hood construction of the first embodiment. Aside from these differences, which will be described more in detail below, the second embodiment is similar to the first and thus the foregoing description will be understood to apply equally to the second embodiment wherein parts which are similar or have a related function will be denoted by like numerals with the addition of a letter suffix and while the two embodiments may differ structurally in some respects, the differences are in the nature of changes to effect improvements which will be within the broader definition of the invention already set forth. The second embodiment is the most preferred form of the apparatus for most purposes, however, it may be found more advantageous to employ one or the other embodiment in certain instances depending on the condition of the crop, the type of crop being harvested, and other factors.

Referring now to FIGS. 5, 5a and 6, a pair of endless brush belts 98b-100b are in horizontal alignment, one carried on each side of the crop row by a pair of upper belt heads 200-201. Each belt head has an upper and lower plate between which there is a pair of belt pulleys 203-204 over which the brush belt is trained. The rear pulley 203 is the drive pulley and is mounted on a vertical shaft 87b which drops down to the level of the lower endless belt drive and thus rotates the drive pulley 69b of the lower brush belt 76b. The forward pulley 204 for the upper belt is adjustable toward or away from the drive pulley 203 on its own shaft 206 which is slidable within slots 207 (FIG. 6) in the belt head. A spring (not shown) connected to the shaft 206 and anchored elsewhere within the belt head may be used to maintain the correct belt tension. The belt run adjacent the crop row follows the contour of the inner periphery of the belt head as seen best in FIG. 6 where the belt is constrained to take a converging path toward the crop row as it runs off the pulley 204 and then parallel to the crop row from about midway of the belt head with the belt bristles interengaged until it runs on to the pulley 203 at the rear.

Similarly, but at a lower level, a pair of endless brush belts 76b-78b are in horizontal alignment, one carried on each side of the crop row by a pair of lower belt heads 208-210. The lower belt heads are similar to tehe upper belt heads already described in that each carries a pair of belt pulleys, a driving pulley 69b-70b at the rear and a driven pulley 59b-60b at the front, over which the brush belts 76b-78b are trained. The pulleys 59b-60b are mounted on shafts in adjusting slots and biased by springs 202 to maintain belt tension as in the upper belt heads. Except for being more elongated, the lower belt heads 208-210 have a contour similar to that of the upper belt heads which causes the lower belts to take a converging path on the inner periphery and then, with the belt bristles interengaging, travel parallel to the crop row until the belts run on to the pulleys 69b-70b at the rear.

Turning attention now to the modified belt drive of the second embodiment, it will be seen in FIGS. 5—5a that the drive inclines downwardly from a main horizontal drive shaft 212 which carries a drive pulley 214. A drive belt 215 (FIG. 5 only) is trained over the pulley 214 at the upper end and over a driven pulley 216 at the lower end with the strands of the belt crossing intermediate the two pulleys such that a clockwise rotation of the drive pulley 214 will effect a counterclockwise rotation of the driven pulley 216 as viewed in FIG. 5. A spring biased idler pulley 220 mounted on a pivoted bracket 221 engages the belt 215 directly behind the driven pulley 216 to maintain the correct tension. Pulley 216 is mounted on an adjustable pulley block 222 (FIG. 5a) having a horizontal stub shaft 223, one end of which carries the pulley 216 and the opposite end of which carries a pulley 224 of the same pitch diameter. An adjusting nut 225 connected to the pulley block 222 maintains the proper drive belt slack adjustment. The pulley 224 is part of a 90° brush belt drive extension comprising a belt 226 trained over the pulley 224 near the front of the upper belt head and extending rearwardly over a pulley 102a mounted on an extension of shaft 87b so as to drive both the upper and lower belt drive pulleys 203-69b. The belt 226 (shown best in FIG. 5) intermediate the pulleys 224 and 228, is turned from the vertical plane of pulley 224 to the horizontal plane of the pulley 102a so as to effect a 90° reversing drive in the sense that if the pulley 224 is rotating in a clockwise manner as viewed from the crop row side, then the pulley 102a will be rotating in a counterclockwise direction driving the upper and lower brush belts 76b-98b on one side of the crop row in the same manner. Adjacent the pulley 102a is an idler pulley 231 which has a circumferential guide groove in which a guide bead on the belt is intended to run. The idler pulley 231 is mounted on a shaft 233 carried on a bracket 234 bolted on the upper plate of the upper belt head. The bracket inclines upwardly and inwardly toward the crop row and also forwardly at such an angle so as to guide the belt through a 90° change of direction between the pulleys 224 and 102a. A cross shaft 230 (FIG. 5a) may be employed from the adjacent drive (not shown) which extends between crop rows to drive the opposite belts 78b-100b in the opposite manner or the drive may be directly from the main drive shaft 212 from a pulley 214'.

A third difference which exists between the first and second embodiments is in the hood construction. In the second embodiment there is a skeleton frame 240 having an upper frame section 241 and a lower frame section 242. The upper frame section inclines downwardly and forwardly mounting at the upper end main drive shaft 212 and pulley 214. At the lower end is mounted the pulley block 222 and idler pulley 220 along with its pivoted support bracket 221. Each upper belt head 200-201 is mounted on a bracket 243 between the upper and lower frame sections 241-242. The lower frame section 242 consists essentially of strut members 244-245 which hold the upper and lower belt heads vertically spaced and in fore and aft alignment. Fitted over the upper frame section 241 is a sheet metal skin 250 (omitted in FIG. 5a for clarity) forming a tapered hood section for the incline belt drive. Similarly, an outer skin 251 (similarly omitted in FIG. 5a) is fastened on to the lower frame section 242 which forms a light weight, sheet metal assembly which houses the belt heads except for the peripheral regions where the belt bristles project beyond the outer skin and interengage with the plant stalks of the crop row passing between adjacent hood sections. The skeleton frame and outer skin thus provide a strong yet light weight, monocoque construction.

OPERATION

The apparatus herein is particularly adapted to harvest a seed crop such as a sunflower seed crop. It is desirable to harvest the crop with a minimum of agitation of the stalks bearing the crop. It is desirable to have means for holding the stalks until they are cut and delivered into the combine.

The harvesting apparatus 10 is advanced into the crop and is adapted to receive the rows of crop between the cooperating pairs of brush belts. The belts rotate in opposite directions converging to have interengagement of their bristles in their common run rearwardly.

As the harvester advances into rows of stalks A, the lower belt brushes hold the stalks therebetween in a stable vertical position until the upper portions of the stalks are engaged by the interengaging bristles of the upper brush members 98 and 100 in the first embodiment or 98b and 100b in the second embodiment. Thus each stalk is held quite securely at a lower and at an upper position when it is cut and the entire stalk is then delivered into the receiving auger member 160 to be carried into the combine.

The apparatus, whether it be in the form of the first embodiment 10 or second embodiment 10a, is particularly efficient for processing row seed crop and the second embodiment is preferred where the plant stalks tend to fan outwardly at the top and a more effective gathering action can be utilized at the upper regions of the plant stalks as provided by the converging bristles of the upper belts. The belts also tend to prevent bunching and more nearly align the stalks without bending or forcing the feed at the top in relation to that at the bottom. The second embodiment has also been found to be very efficient in fields where the crop has been blown down or is otherwise leaning more in one direction than another. This again is believed due to the better gathering and aligning functions of the cooperating upper and lower brush belts.

Thus rows of crop are harvested by operating portions of the harvester well coordinated with one another.

There is but little shaking of the stalk head containing the seed crop prior to the deposit of the stalk head onto the auger 160.

The operating height of said apparatus 10—10a is readily regulated by the combine operator such as by means of the hydraulic cylinders controlling the piston arms 141 and 142 as above described.

Thus it is seen that there has been provided a simple and efficient harvesting apparatus which has proved very successful in operation.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A harvesting attachment for a combine, having in combination,
   a supporting frame structure having a forwardly extending pair of transversely spaced plate members,
   an endless brush belt carried by each of said plate members,
   said brush belts having close proximity along the adjacent sides of said plate members,
   a pair of circular disc like brush members disposed adjacent the rearward portions of said plate members in vertically spaced relation to said brush belts and having close proximity to one another at the adjacent sides of said plate members, and
   means driving said brush belts and said circular brushes and having the adjacent sides of said brush belts and of said circular brushes move in a direction rearwardly of said plate member.

2. The structures set forth in claim 1, wherein said brush belts have bristles of such length as to have interengagement therebetween along the adjacent sides of said plate members.

3. The structure set forth in claim 1, wherein, said circular brushes have bristles of such length as to have interengagement therebetween at the adjacent sides of said plate members.

4. The structure set forth in claim 1, wherein said plate members each carry a pulley at either end thereof, said brush belts pass over said pulley and define a path in a substantially horizontal plane.

5. The structure set forth in claim 4, wherein each of said plate members has a shaft upstanding therefrom,
   said circular brushes are respectively mounted onto said shafts, and
   means connect said driving means to said driving means to said shaft and to said pulleys to coordinately drive said brush belts and said circular brushes.

6. The structure set forth in claim 1, wherein said brush belts and said circular brushes are arranged and constructed to retain engagement with and hold the stalks of the crop harvested until said stalks and the crop of seeds that they bear are delivered to said combine.

7. The structure set forth in claim 1, wherein said brush belts and said circular brushes are arranged and constructed to receive and hold the stalks of the crop being harvested until said stalks have been cut free by the cutter bar of the combine and delivered to said combine.

8. A harvesting attachment for a combine comprising a plurality of forwardly tapered hood structures laterally spaced from each other so as to pass between crop rows,
   a pair of endless brush belts, one carried by each hood structure in horizontal alignment on opposite sides of the crop row,
   said brush belts each carrying relatively stiff bristles projecting outwardly from the belt and along the adjacent inner sides of said hood structures having a continuous exposed run in close cooperative relationship with the opposite belt run parallel to the crop row, and means driving said brush belts, said drive means rotating said brush belts on opposite sides of the crop row at a generally uniform rate consistent with the rate of travel of the harvesting attachment whereby the crops are held relatively upright with a minimum of shaking.

9. A harvesting attachment according to claim 8 wherein each hood structure comprises in addition,
   a second pair of endless brush belts, one carried by each hood structure and being disposed at a higher level than said first mentioned pair of brush belts,
   said second pair of brush belts each carrying relatively stiff bristles projecting outwardly from the belt and along the adjacent inside sides of said hood structures, having an exposed continuous run in close cooperative relationship with the opposite belt run parallel to the crop row, and
   said drive means also being connected to said second pair of brush belts.

10. A harvesting attachment according to claim 9 wherein said drive means comprises
    a main drive shaft extending transversely of and at a higher elevation than said second pair of brush belts,
    a downwardly inclined drive extending from said main drive shaft,
    a stub shaft extending parallel to said main drive shaft within one said hood structure.
    a drive extension in said hood structure including a first rotary drive element driven by said stub shaft,
    a second rotary drive element rotating on a vertical axis drivably coupled to said first rotary drive element and extending downwardly in driving relationship with the upper and lower endless brush belts in said hood structure.

11. A harvesting attachment according to claim 10 comprising
    an internal rigid frame having a downwardly inclined upper portion supporting said downwardly inclined drive,
    a lower portion,
    a pair of belt head structures, one housing an endless brush belt of said second pair of belts and being secured between said upper and lower frame portions,
    the other belt head structure housing an endless brush belt of said first pair of belts and being secured on the said lower frame portion vertically spaced below said one belt head structure and a covering on said frame forming the outer surfaces of said hood structure having a light weight per unit area and providing little structural support for said hood structure.

* * * * *